United States Patent [19]
Greenberg

[11] 3,815,231
[45] June 11, 1974

[54] ROTARY PINKING SHEAR DEVICE

[76] Inventor: Bessie R. Greenberg, 5016 Bingham St., Philadelphia, Pa. 19120

[22] Filed: Dec. 4, 1972

[21] Appl. No.: 311,648

[52] U.S. Cl.......................... 30/228, 30/230, 30/240
[51] Int. Cl...................... B26b 15/00, B26b 13/10
[58] Field of Search ............ 30/230, 240, 263, 178, 30/205, 228

[56] References Cited
UNITED STATES PATENTS

| | | | |
|---|---|---|---|
| 2,285,249 | 6/1942 | Barentzen | 30/230 UX |
| 2,578,346 | 12/1951 | Florian et al. | 30/178 |

Primary Examiner—Othell M. Simpson
Assistant Examiner—Marc R. Davidson
Attorney, Agent, or Firm—Jacob Trachtman

[57] ABSTRACT

A rotary pinking shear device comprised of a body having a first end for receiving material to be sheared and a second end providing a handle, the first end has a bottom portion and a top portion spaced from the bottom portion to provide an opening in the body for receiving material therein, cutting means including a bottom wheel rotatably supported by the bottom portion of the body and extending into the opening of the body and a top wheel rotatably supported by the top portion of the body and extending into the opening of the body and engaging the bottom wheel for cutting material entering the opening of the body, and energizing means for rotating the bottom and top wheels.

10 Claims, 5 Drawing Figures

PATENTED JUN 11 1974     3,815,231
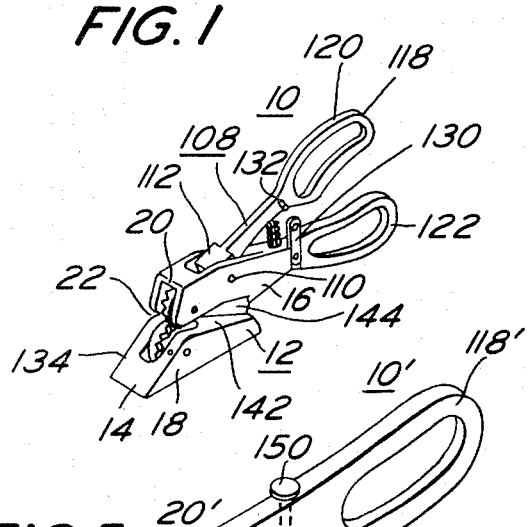
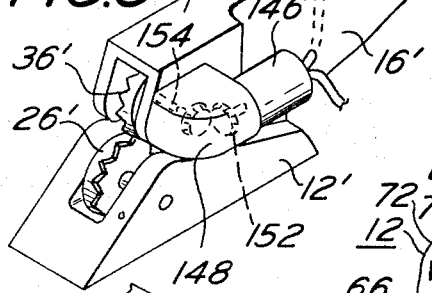
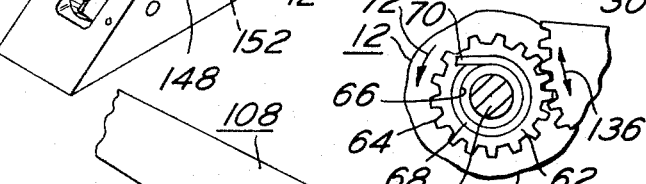
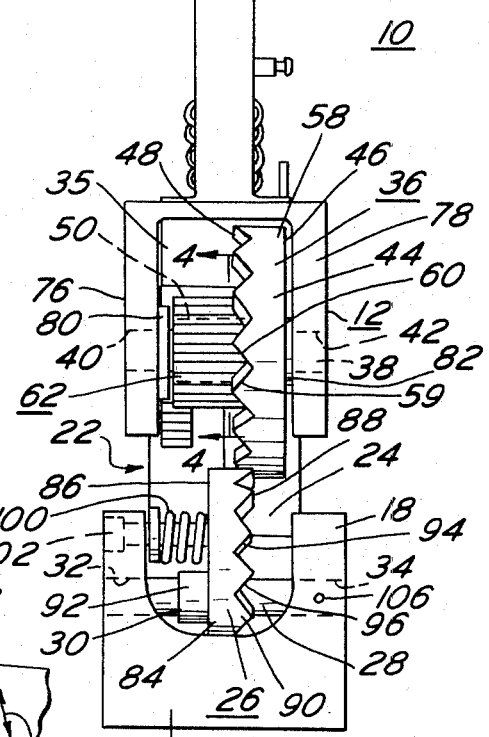
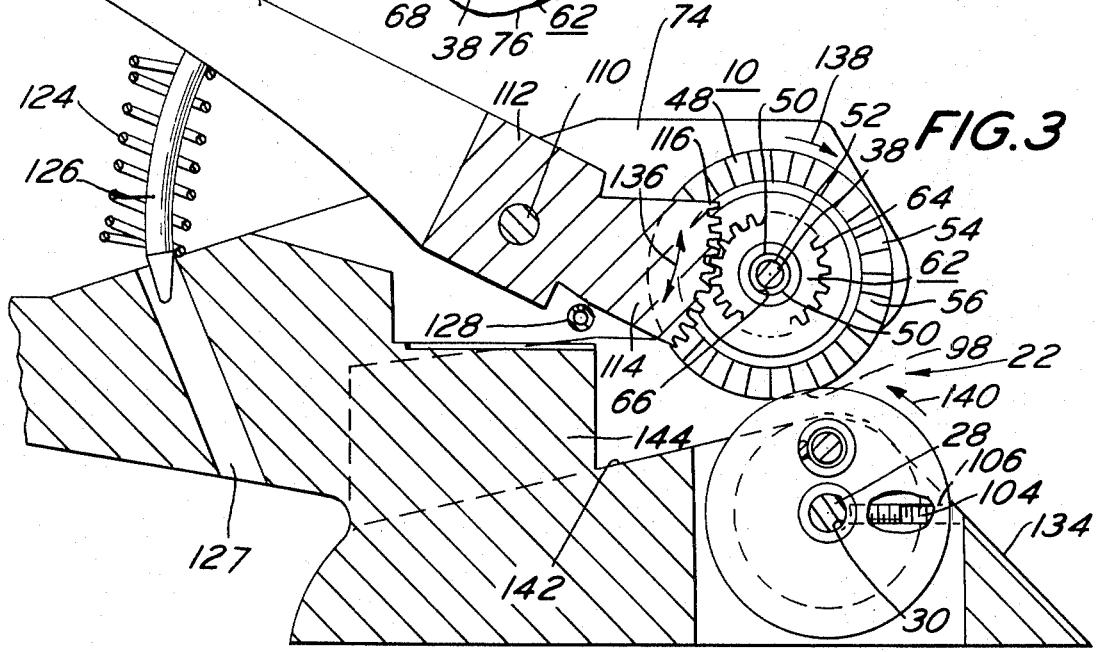

ROTARY PINKING SHEAR DEVICE

The invention relates to a pinking shear device, and particularly a rotary pinking shear device which may be manually or electrically motivated.

Although pinking shear devices have been previously produced, such devices are difficult to use and require care in producing a continuous patterned cut without the misalignment of the pattern with each cutting action. The present invention overcomes such difficulties by providing a pinking shear having a rotary cutting means so that the cutting pattern may be continuous and material can be cut in any required design without difficulty.

An object of the invention is therefore, to provide a new and improved pinking shear device which includes rotary cutting elements for providing ease in making a continuous cutting pattern in material being cut.

Another object of the invention is to provide a new and improved pinking shear device in which material may be received therein for a continuous cutting operation.

Another object of the invention is to provide a new and improved pinking shear device which may be either manually or electrically motivated and may readily be handled in operation.

Another object of the invention is to provide a new and improved pinking shear device which is rugged in construction and requires minimum of maintenance for long lasting service.

The above objects as well as many other objects of the invention are achieved by providing a rotary pinking shear comprising a body having a first end for receiving material to be sheared and a second end providing a handle. The first end of the body has a bottom portion and a top portion spaced from the bottom portion forming an opening in the body for receiving material. A cutting means is supported by the first end of the body including a bottom cutting wheel rotatably mounted in the bottom portion of the body and extending into the opening of the body and a top cutting wheel rotatably mounted in the top portion of the body and extending into the opening of the body and engaging the bottom wheel for cutting material there between in the opening of the body.

The top and bottom wheels each have an outer side and an inner side, the inner sides of the wheels being provided with respective undulating surfaces about the periphery of the wheels. The top and bottom wheels rotate about respective substantially parallel axes spaced from each other to provide an overlapping relationship at a peripheral region of the wheels. The wheels are arranged in side by side relationship with their undulating surfaces interengaged at a peripheral region. Each of the wheels has a cylindrical periphery surface of circular cross section so that the wheels provide cutting edges of triangular configuration on the cylindrical surface of the wheels formed by their undulating surfaces.

In a mechanically actuated embodiment, the shear device includes a lever pivotally secured with the body having a first end for rotatably actuating the wheels when reciprocated while the second end provides a second handle which is movable with respect to the first handle. The top wheel is conditionally connected with a gear element, and the first end of the lever has a plurality of gear teeth engaging the gear element of the top wheel for rotating the element and actuating the top wheel with the reciprocation of the lever by movement of the handles towards and away from each other. The gear element, includes a clutch means which secures the gear element with the top wheel when the gear element is rotated in one direction by the lever while disengaging the gear element when it is rotated in the opposite direction, thereby providing intermittent motion of the wheel in the same direction with the reciprocation of the lever. The interdigitation of the top and bottom wheels results in the rotation of both wheels by such actuation.

In an electrically energized form of the pinking shear device, an electric motor means is supported by the body and engages and controllably actuates the top wheel of the cutting means for rotation in the direction for drawing into and cutting said material between the wheels. A control switch is supported by the body proximate to the handle means for controlling activation of the motor.

The foregoing and other objects of the invention will become more apparent as the following detailed description of the invention is read in conjunction with the drawing, in which:

FIG. 1 is a perspective view of a rotary pinking shear device embodying the invention.

FIG. 2 is a front elevational view of the device of FIG. 1 with a portion broken away, FIG. 3 is an enlarged sectional view taken on the line 3—3 of FIG. 2, FIG. 4 is a sectional view taken on line 4—4 of FIG. 2, and FIG. 5 is a perspective view of a modified form of rotary pinking shear device embodying the invention.

Like reference numerals designate like parts throughout the several views.

FIGS. 1 thru 4 disclose a rotary pinking shear device 10 embodying the invention. The device 10 has a body 12 with a front end 14 and rear end 16. The front end 14 has a bottom portion 18 and a top portion 20 spaced from the bottom portion 18 to provide an opening 22 therebetween for receiving material to be cut.

The bottom portion 18 of the body 12 is provided with a cavity 24 receiving therein a cutting wheel 26. The cutting wheel 26 is rotatably mounted on a shaft 28 which passes through the center opening 30 of the wheel 26. The ends of the shaft 28 are supported by the bottom portion 18 of the body 12 by being received into openings 32 and 34. A top cutting wheel 36 is rotatably mounted in a cavity 35 of the top portion 20 of the body 12 on a shaft 38 which has its ends received in openings 40, 42 for securing same with the body 12. The top wheel 36 comprises a disc 44 having an outer side 46 and an inner side 48, and a central hub 50 extending from the inner side 48 of the disc 44. A central opening 52 through the disc 44 and hub 50 receives the shaft 38 for rotatably mounting the cutting wheel 36. The wheel 36 on its inner side 48 about its periphery 54 is provided with an undulating surface 56 providing a triangular tooth configuration 59 which is clearly seen on the outer peripheral circular cylindrical surface 58 of the disc 44. The intersection of the undulating surface 56 and the peripheral surface 58 of the disc 44 provides the cutting edges 60 of triangular configuration.

A gear wheel 62 with radially extending teeth 64 and a central opening 66 is rotatably mounted with said cutting wheel 36 by receiving the hub 50 of the wheel 36 through its opening 66. The gear wheel 62 is provided, within its opening 66, with a helical spring 68 having convolusions contacting its inner surface. One end 70 of the spring 68 is secured with the gear wheel, while the other end and its convolusions are free to move responsive to actuation by the gear wheel 62. Thus, if the gear wheel 62 is rotated in the counterclockwise direction shown by the arrow 72 in FIG. 4, the spring element 68 will be drawn tightly about the outer surface of the hub 50 causing the cutting wheel 36 to rotate with the gear wheel 62. However, if the gear wheel 62 is caused to rotate in the opposite or clockwise direction, the end 70 of the spring element 68 causes the spring to move in a direction releasing it and causing it to slip on the outer surface of the hub 50, so that this clockwise motion is not transmitted to the cutting wheel 36. The spring element 68 thus forms a clutch mechanism which causes the gear wheel 62 to transmit motion to the cutting wheel 36 only when the gear wheel 62 is rotated in a counterclockwise direction.

The cutting wheel 36 and gear wheel 62 are supported within the cavity 35 of the upper portion 20 of the body 12 below the top 74 and between side walls 76 and 78 of the body 12, and washers 80 and 82 are provided about the ends of the shaft 38 for spacing the wheels 36 and 62 within the cavity 35.

The bottom wheel 26 is also comprised of a disc 84 having an outer side 86, an inner side 88 and an outer circular cylindrical peripheral surface 90. A central hub 92 extends from the outer surface 86, while the inner surface 88 is provided with an undulating surface 94 about its periphery similar to the undulating surface 48 of the cutting wheel 36. The undulating surface 94 is also of triangular configuration and provides cutting edges 96 along its lines of intersection with the peripheral surface 90.

The cutting wheels 26 and 36 interact to provide the cutting means of the device 10 and are positioned to rotate about their shafts 28 and 38 which are substantially parallel to each other and spaced apart so that the wheels overlap in a limited region 98 within the opening 22 between the bottom and top portions 18 and 20 of the body 12 as clearly shown in FIG. 3.

The overlapping relation is achieved by the positioning of the cutting wheels 26 and 36 in side to side relationship so that the undulating surfaces 94 and 56 interdigitate in the radial direction through the peripheral surfaces 90 and 58 with their respective edges providing the shearing and cutting action of triangular configuration on the cut material.

In order to insure optimum cutting and shearing action by the wheels 26,36, a coil spring 100 is retained within the cavity 24 by a screw element 102 and has an end contacting and exerting force on the outer side 86 of the upwardly extending region of the wheel 26. Since the wheel 26 is also movable along its shaft 28 its undulating surface 56 is forced against the undulating surface 56 of the top wheel 36 assuring good contact and cutting action as the edges pass one another in the region 98 as the wheels are rotated with respect to each other. To further assure optimum cutting action, the opening 34 which receives an end of the shaft 28 is enlarged, and a screw element 104 is threadedly engaged in an opening 106 for contacting and displacing the end of the shaft for adjusting its relationship with respect to the shaft 38 of the top wheel 36. The adjustment of the skew angle of the lower axis with respect to the upper axis controls the angle at which the undulating surfaces interengage and of the shearing action as well as the self-sharpening action of the interdigitating undulated surfaces.

For the purpose of actuating the device 10, a lever 108 is provided which is pivotally secured by a pin 110 with the second end 16 of the body 12. The intermediate portion 112 of the lever 108 is positioned within the cavity 35 between the walls 76 and 78. The front end 114 of the lever 108 is provided with a plurality of gear teeth 116 which engage the teeth 64 of the gear wheel 62, while the other end 118 provides a handle 120. The second end 16 of the body 12 also provides a handle 122. A coil spring 124 is positioned with one end engaging the lever 108 at a point between its intermediate portion 112 and its handle 120 and its other end engaging the end 16 of the body 12 for normally maintaining the handles 120 and 122 in a spaced apart relationship as shown in FIGS. 1 and 3. A curved guide pin 126, secured with the lever 108, retains the spring in position, while an opening 127 in the body 12 allows the extending end of the pin 126 to be received therein during pivotal reciprocating motion of the lever 108 with respect to the body 12. In the raised position of the handle 120 as shown in FIGS. 1 and 3, the front end 114 of the lever 108 engages a stop pin 128 to provide an upper limit. The downward motion of the handle 120 is also limited by the full compression of the spring 124. A latch means comprisisng an upstanding member 130 attached at one end with the end 16 of the body 12, is provided with an opening at its other end which receives a pin 132 secured with the lever 108 for maintaining the device 10 in its closed position when not being used with the handle 120 proximate to the handle 122.

In the operation of the shear device 10, material such as cloth which is to be cut is moved towards the opening 22 over the inclined front surface 134 of the bottom portion 18 of the front end 14 of the body 12. The material is thus received between the bottom and top cutting wheels 26 and 36 at their overlapping region 98. Reciprocal movement of the lever 108 provided by scissor-like action manually applied to the handles 120 and 122 by an operator, results in imparting a reciprocating motion to the front end 114 of the lever 108 as indicated by the double headed arrows 136 in FIGS. 3 and 4. This imparts a reciprocating rotary movement to the gear wheel 62 mounted on the top cutting wheel 36. Due to the clutch action of the spring 68 in the gear wheel 62, the disc 44 of the cutting wheel 36 is caused to move only in the clockwise direction indicated by the arrow 138 of FIG. 3 effected when the handle 120 is moved in a downward direction towards the handle 122. The upward movement of the handle 120 imparts no movement to the disc 44 of the cutting wheel 36. The interengagement of the disc 44 of the top wheel 36 with the disc 84 of the bottom wheel 26 drives the bottom wheel in the counterclockwise direction shown by the arrow 140 in FIG. 3.

The intermittent rotation of the wheels 26 and 36 with the reciprocation of the lever 108, draws the material between the wheels and cuts the material in a triangular or zigzag pattern. After being cut, the material on each side of the cut is guided over the downwardly sloping surface 142 and the material on each side of the cut is separated by the triangular wedged shape portion 144 at the second end 16 of the body 12 between the bottom and top portions 18 and 20. The material may be cut along any line to provide the triangular cutting design by either movement of the device 10 to receive material along such a line or the positioning of the material as it is received into the opening 22 of the device 10 in the case where the device remains stationary or secured to a supporting surface.

With the operation of the shearing device 10, it is noted that the material being cut is retained between wheels 26 and 36 until the completion of the cutting operation although the lever 108 imparts intermittent movement of and cutting action of the wheels. This assures that the pinking shear device produces a cut which has a continuous triangular design avoiding misregistration and other such defects caused in the cutting of material by prior art devices.

Refer now to FIG. 5 which is a perspective view of a rotary pinking shear device 10' which is a modified form of the device 10. Since the device 10' is structurally in many respects identical to that of the device 10, only those aspects of the structure which are different will be described in detail.

The device 10' differs from the device 10 by providing the end 16' of its body 12' with a handle 118' adapted for receiving the hand of an operator, while replacing the manual level actuating means with an electric motor 146 and gear box 148 securing with the top portion 20' of the body 12'. The motor 146 is electrically connected with a control button 150 which is positioned on the end 16' of the body 12 just in front of the handle 118' for easy actuation by the operator. When the motor 146 is energized upon the actuation of the button 150, rotary motion is imparted to the gear box 148 which may contain gears 152 for changing the direction of power transmission and speed reduction. The gear box 148 drives a shaft 154 on which the upper gear wheel 36', is secured for rotation therewith. The top wheel 36' is, thus, driven by the motor 146 through the gear box 148 and in turn interengages with and drives the bottom cutting wheel 26'. Thus, the pinking shear device 10', provides electrical energization for continuously cutting material which is drawn into and received between the cutting wheels 26' and 36'. The cutting operation, is under the control of the operator by manipulation of the switch 150. As in the case of the device 10, the device 10' produces a cut edge of material having a continuous triangular design pattern along any desired line on the material, at a high speed, and with great facility.

It will, of course, be understood that the dscription and drawing, herein contained, are illustrative merely, and that various modifications and changes may be made in the structure disclosed without the departing from the spirit of the invention.

What is claimed is:

1. A rotary pinking shear device comprising a body having a first end for receiving material to be sheared and a second end, said first end having a bottom portion and a top portion spaced from the bottom portion to provide an opening in said body for receiving said material therein, cutting means including a bottom wheel rotatably supported by the bottom portion of said body and extending into the opening of said body and a top wheel rotatably supported by said top portion of said body extending into the opening of said body and engaging said bottom wheel for cutting material entering the opening of said body, and energizing means for rotating said bottom and top wheels, said top and bottom wheels each have an outer side with a flat surface about the periphery thereof and an inner side, the inner sides of said wheels being provided with respective undulating surfaces about the periphery of said wheels, said top and bottom wheels rotating about respective substantially parallel axes spaced from each other to provide an overlapping relationship at a peripheral region of said wheels, said wheels being arranged in side by side relationship with their undulating inner side surfaces in interengagement at said peripheral region, each of said wheels having a cylindrical peripheral surface of circular cross section and the undulating surfaces of said wheels providing sharp cutting edges of triangular configuration on said cylindrical surfaces of said wheels, while marginal cylindrical surfaces of varying width are provided on said cylindrical surfaces between said cutting edges and the outer sides of said wheels.

2. The rotary shear device of claim 1 in which the one of the said wheels rotates about a shaft which has its axis adjustable with respect to the axis of the other wheel for controlling the skew angle between said axes and the angle at which the undulating surfaces of said wheels interengage each other for assuring optimum cutting action.

3. The rotary shear device of claim 1 in which the bottom wheel rotates about a shaft having one of its ends secured with said body and the other end received in an enlarged opening, and screw means engaging the other end of said shaft for adjusting the position thereof for controlling the skew angle between the axes of the top and bottom wheels and the angle at which the undulating surfaces of said wheels interengage each other for assuring optimum cutting action.

4. The rotary shear device of claim 1 including a spring supported by said body and engaging the outer side of said bottom wheel at a location intermediate to the axis of said bottom wheel and the region of interengagement of said top and bottom wheels, said spring urging the undulating surface of said bottom wheel against the undulating surface of said top wheel for assuring good contact and cutting action as the cutting edges of said wheels pass each other at the region of interengagement of said wheels.

5. The rotary shear device of claim 2 including a coil spring having a first end secured with the bottom portion of said body and a second end extending into the opening of said body toward the outer side of said bottom wheel, the second end of said spring slidably engages the flat outer surface of said bottom wheel at a location intermediate the axis of said bottom wheel and the region of interengagement of said top and bottom wheels, said spring urging the undulating surface of said bottom wheel against the undulating surface of said top wheel for assuring good contact and cutting action as the cutting edges of said wheels pass each other at the region of interengagement of said top and bottom wheels.

6. The rotary shear device of claim 5 in which the bottom portion at the first end of said body has a flat bottom surface and a top surface inclined upwardly toward the second end of said body and intersecting with said bottom surface at a front region for receiving material thereover into the opening of said body to be cut by said wheels, said body has a surface which slopes downwardly toward said second end of said body following said upwardly inclined surface for receiving said material after it passes into said opening and the second end of said body having a triangular wedge shaped portion positioned between the top and bottom portion of the first end of said body and above said downwardly sloping surface for separating the material on each side of the cut made by the wheels after the cutting operation.

7. The rotary shear device of claim 6 in which said second end of said body is provided with a first handle, and including a lever pivotally secured with said body having a first end for rotatably actuating said wheels when reciprocated and a second end providing a second handle movable with respect to said first handle.

8. The rotary shear device of claim 7 in which said top wheel is provided with a gear element, and the first end of said lever has a plurality of gear teeth engaging the gear element of the top wheel for rotating said element and actuating said top wheel with the reciprocation of said lever by movement of said handles alternating toward and away from each other.

9. The rotary shear device of claim 8 in which said top wheel includes a clutch means engaging said gear element when the gear element is rotated in one direction by said lever and disengaging said gear element when it is rotated in the opposite direction thereby providing intermittent motion of said top wheel in the same direction with the reciprocation of said lever.

10. The rotary shear device of claim 6 in which said energizing means includes an electric motor means supported by said body engaging and controllably actuating the top wheel of said cutting means for rotation in the direction for drawing and cutting said material between the wheels.

\* \* \* \* \*